(12) United States Patent
Ahmady (10) Patent No.: US 9,353,967 B2
(45) Date of Patent: May 31, 2016

(54) FLUID HEATING APPARATUS

(76) Inventor: Farshid Ahmady, Rochester Hills, MI (US)

(*) Notice: Subject to any disclaimer, the term of this patent is extended or adjusted under 35 U.S.C. 154(b) by 1130 days.

(21) Appl. No.: 12/658,150

(22) Filed: Feb. 3, 2010

(65) Prior Publication Data

US 2011/0185985 A1 Aug. 4, 2011

(51) Int. Cl.
| | |
|---|---|
| F24H 1/18 | (2006.01) |
| F28F 13/12 | (2006.01) |
| F28D 7/00 | (2006.01) |
| F24H 1/43 | (2006.01) |
| F24H 8/00 | (2006.01) |
| F28F 9/00 | (2006.01) |

(52) U.S. Cl.
CPC .. F24H 1/18 (2013.01); F28D 7/00 (2013.01); F28F 13/12 (2013.01)

(58) Field of Classification Search
None
See application file for complete search history.

(56) References Cited

U.S. PATENT DOCUMENTS

| | | | | | |
|---|---|---|---|---|---|
| 2,064,928 | A | * | 12/1936 | Lewis | 165/166 |
| 3,630,175 | A | * | 12/1971 | Reid, Jr. | F24H 1/145 122/250 R |
| 3,643,733 | A | * | 2/1972 | Hall et al. | 165/81 |
| 3,734,065 | A | * | 5/1973 | Reid et al. | 122/250 R |
| 3,894,579 | A | * | 7/1975 | Brille | 165/6 |
| 4,131,159 | A | * | 12/1978 | Long | 165/166 |
| 4,852,640 | A | * | 8/1989 | McKenna | 165/47 |
| 5,516,278 | A | * | 5/1996 | Morrison | 431/171 |
| 5,653,387 | A | * | 8/1997 | Takayanagi et al. | 237/12.3 C |
| 5,687,678 | A | * | 11/1997 | Suchomel et al. | 122/250 R |
| 5,713,310 | A | * | 2/1998 | Lemke | 122/248 |
| 5,755,280 | A | * | 5/1998 | da Costa et al. | 165/140 |
| 5,966,838 | A | * | 10/1999 | Krebs | B01D 53/005 34/467 |
| 6,026,804 | A | * | 2/2000 | Schardt et al. | 126/344 |
| 6,295,980 | B1 | * | 10/2001 | Lopez et al. | 126/344 |
| 6,305,331 | B1 | * | 10/2001 | Fullemann et al. | 122/18.3 |
| 6,428,313 | B1 | * | 8/2002 | Rodgers et al. | 431/354 |
| 6,641,625 | B1 | * | 11/2003 | Clawson et al. | 48/127.9 |
| 6,986,797 | B1 | * | 1/2006 | Clawson et al. | 48/102 A |
| 7,028,478 | B2 | * | 4/2006 | Prentice, III | 60/645 |
| 7,066,973 | B1 | * | 6/2006 | Bentley et al. | 48/197 R |
| 7,281,497 | B2 | * | 10/2007 | Le Mer et al. | 122/31.2 |
| 7,302,916 | B2 | * | 12/2007 | LeMer et al. | 122/18.1 |
| 7,428,883 | B2 | * | 9/2008 | Hamada et al. | 122/31.1 |
| 7,431,893 | B1 | * | 10/2008 | Nakamoto et al. | 422/135 |
| 7,523,721 | B2 | | 4/2009 | Hamada et al. | |
| 7,617,802 | B2 | * | 11/2009 | Le Mer et al. | 122/18.1 |
| 7,909,005 | B2 | * | 3/2011 | Le Mer et al. | 122/31.1 |
| 2001/0031440 | A1 | * | 10/2001 | Fullemann et al. | 432/175 |

(Continued)

*Primary Examiner* — Gregory Huson
*Assistant Examiner* — Eric Gorman
(74) *Attorney, Agent, or Firm* — Raggio & Dinnin, P.C.

(57) ABSTRACT

A fluid heating apparatus for use in water heaters, boilers, cooking applications or the like comprising a body. The fluid heating apparatus also comprises a primary heat exchanger arranged within the body and a secondary heat exchanger arranged adjacent to the primary heat exchanger within the body. The apparatus also comprises a burner arranged within the primary heat exchanger. The primary heat exchanger comprises a plurality of concentric doughnut shaped plates arranged over the burner. A blocking plate is arranged adjacent to one of the concentric plates of the primary heat exchanger. The secondary heat exchanger comprises a plurality of concentric doughnut shaped plates arranged adjacent to the blocking plate on a side opposite of the plates of the primary heat exchanger. The apparatus further comprises a manifold in fluid communication with the plurality of concentric plates and blocking plates of both the secondary heat exchanger and primary heat exchanger.

19 Claims, 3 Drawing Sheets

(56) References Cited

U.S. PATENT DOCUMENTS

| | | | |
|---|---|---|---|
| 2002/0050342 A1* | 5/2002 | Gerstmann et al. | 165/109.1 |
| 2003/0024525 A1* | 2/2003 | Jennings | 126/39 R |
| 2003/0079869 A1* | 5/2003 | Brunner et al. | 165/157 |
| 2003/0183374 A1* | 10/2003 | Voss et al. | 165/110 |
| 2005/0133202 A1* | 6/2005 | Jorgensen et al. | 165/103 |
| 2006/0053791 A1* | 3/2006 | Prentice, III | 60/645 |
| 2006/0219395 A1* | 10/2006 | Le Mer | F24H 1/43 165/163 |
| 2006/0225422 A1* | 10/2006 | Prentice, III | 60/645 |
| 2007/0099134 A1* | 5/2007 | Hamada et al. | 431/12 |
| 2007/0119388 A1* | 5/2007 | Waseda et al. | 122/7 R |
| 2007/0209606 A1* | 9/2007 | Hamada et al. | 122/18.1 |
| 2007/0221143 A1* | 9/2007 | Hamada | F24H 1/43 122/235.14 |
| 2008/0185132 A1* | 8/2008 | Cannas | 165/163 |
| 2008/0186039 A1* | 8/2008 | Cannas | 324/760 |
| 2010/0229804 A1* | 9/2010 | Okamoto et al. | 122/18.2 |
| 2011/0041781 A1* | 2/2011 | Deivasigamani | F28F 1/36 122/18.1 |
| 2012/0312513 A1* | 12/2012 | Le Mer et al. | 165/159 |
| 2015/0044589 A1* | 2/2015 | Yamamoto | 429/425 |
| 2015/0285560 A1* | 10/2015 | Silversand | F23C 5/08 165/166 |
| 2016/0040556 A1* | 2/2016 | Hikichi | F01K 3/205 60/670 |

* cited by examiner

FLUID HEATING APPARATUS

BACKGROUND OF THE INVENTION

1. Field of the Invention

The present invention generally relates to a fluid heating apparatus, and more particularly relates to a high efficiency low pollutant fluid heating apparatus.

2. Description of Related Art

Boilers or water heaters have been known for many years in the prior art. Many of these water heaters are equipped with a burner that include a housing surrounding a boiler compartment, a cylindrical heat exchanger, which divides the boiler compartment into a combustion chamber and an exhaust chamber, whereby the heat exchanger comprises passages distributed across its surface for the hot exhaust gas and a burner head positioned in the combustion chamber.

Many of these prior art heaters have been constructed using burners and heat exchanger water flow tubing. These prior art water heaters must be capable of producing and heating water with tens of thousands and millions of BTU's. Further, in modern commercial applications, the emissions standards for water heaters are becoming much more strict. Complete burning of fuel is controlled so that hydrocarbon emissions are very low and in many existing prior art water heaters natural gas is burned in an environment of forced air. Furthermore, the quest for conserving energy and resolving environmental issues, which many encounter in the art today, have created a demand for more efficient and cleaner heating systems. Prior art fluid heating systems, such as water heaters, boilers, cooking appliances, etc., tremendously contribute to the demand on our energy resources. Therefore, the design of an efficient heat exchanger and a supporting combustion system becomes extremely critical in the design of clean and efficient heating systems commonly called "green fluid heating systems".

Many of the prior art systems are not efficient and produce too much pollution and/or are extremely complicated and expensive to manufacture. Furthermore, many of these prior art heating systems require a high level of automation and capital cost to produce one unit. These restrictions on the prior art apparatuses do not allow a practical means for manufacturing and impedes the wide spread use of these more efficient designs. Therefore, there is a need in the art for an overall change of direction in these systems specifically, in conserving energy such that the environmental impact is minimal from the heating units.

Many present high efficiency heat exchangers utilize a single continuous tube (circular or oblong) in a coil or serpentine shape for every pass to achieve high efficiency in transferring heat by increasing the contact surface area. As a result, fluid flow becomes restricted due to a smaller cross sectional area and it also creates a substantial pressure drop across the heat exchanger. In some cases this causes a need for an external pump to provide the needed flow volume.

Therefore, there is a need in the art for a high efficiency low pollutant fluid heating apparatus. Furthermore, there is a need in the art for a fluid heating apparatus that uses a high efficiency gas burner and blower combination, which will allow for the burner to emit radiant energy to hollow plates carrying a fluid. There also is a need in the art for an easy and inexpensive way to manufacture via simple stamping or other processes, the interior plates for a heating apparatus. There also is a need in the art for a heating apparatus that uses a burner flame that consists of a plurality of smaller flames over a larger area rather than one single large flame which will allow for reduction of adiabatic flame temperature which results in reducing oxides of nitrogen which are generally classified as pollutants. There also is a need in the art for a better radiation heat transfer from the burner to the plates, which occurs via the use of many smaller flames over a large area. Furthermore, there is a need in the art for a high efficiency heating apparatus with minimal pressure drop.

SUMMARY OF THE INVENTION

One object of the present invention may be to provide a heating apparatus.

Another object of the present invention may be to provide an improved high efficiency low pollutant fluid heating apparatus.

Still another object of the present invention may be to provide a fluid heating apparatus that comprises a series of parallel very thin hollow shaped plates attached with inlet and outlet tubes.

Yet a further object of the present invention may be to provide a fluid heating apparatus that includes a blocking plate arranged between a plurality of hollow doughnut shaped plates to allow for better heat transfer from the burner to the fluid.

Still another object of the present invention may be to provide a fluid heating apparatus that includes a primary heat exchanger and a secondary heat exchanger arranged within a body or jacket of the heating apparatus.

Still another object of the present invention may be to provide a fluid heating apparatus with a high efficiency gas burner arranged within the heat exchanger along a center line of the plates of the heat exchanger.

Still another object of the present invention may be to provide for fluid transfer to occur within the heat exchanger wherein the coldest fluid will come into contact with the hottest section of the heat exchanger for maximum heat transfer.

Yet another object of the present invention may be to provide a fluid heating apparatus that is easy and inexpensive to manufacture.

Yet a further object of the present invention may be to provide a burner flame in a fluid heating apparatus that consists of many small flames over a large area rather than one large single flame, which will allow for reduction of adiabatic flame temperature, thus reducing the pollutants of the system while also increasing the radiation heat transfer from the burner to the plates of the heat exchanger.

According to the present invention, the foregoing and other objects and advantages are obtained by a novel design for a fluid heating apparatus. The fluid heating apparatus comprises a body and a primary heat exchanger arranged within the body. The fluid heating apparatus also comprises a secondary heat exchanger arranged adjacent to, the primary heat exchanger and within the body. The apparatus also comprises a burner arranged within the primary heat exchanger. The apparatus further includes the primary heat exchanger having a plurality of concentric plates arranged over the burner. A blocking plate is arranged adjacent to one of the concentric plates of the primary heat exchanger. The apparatus also comprises the secondary heat exchanger including a plurality of concentric plates arranged adjacent to the blocking plate on a side opposite of the primary heat exchanger. The apparatus also comprises a manifold in fluid communication with a plurality of concentric plates and the blocking plate.

One advantage of the present invention may be that it provides for a fluid heating apparatus.

A further advantage of the present invention may be that it provides for an improved fluid heating apparatus that has high efficiency and low pollutants.

Still a further advantage of the present invention may be that it provides a fluid heating apparatus that comprises a series of parallel very thin round hollow doughnut shaped plates with inlet and outlet tubes attached thereto.

Yet a further advantage of the present invention may be that it provides a blocking plate, which is comprised of two hollow plates in the form of discs, thus forming a hollow disc.

Still another advantage of the present invention may be that it provides a plurality of plates arranged in a concentric series being inserted within a body or jacket with inlet and outlet manifolds arranged on each side.

Still a further advantage of the present invention may be that plates on the burner side of the blocking plate form a primary heat exchanger while plates on the exhaust side of the blocking plate form a secondary heat exchanger.

Yet a further advantage of the present invention may be that a high efficiency gas burner is inserted within the center of the heat exchanger along a center line of the body and concentric doughnut shaped plates.

Yet a further advantage of the present invention may be that the cold fluid enters an inlet manifold which allows for the cold fluid to contact the hottest section of the heat exchanger for maximum heat transfer.

Still another advantage of the present invention may be that the plates of the heat exchangers are both easy and inexpensive to manufacture and require less time for assembly thus reducing total cost of the heating apparatus.

Still another advantage of the present invention may be that it provides for a fluid heating apparatus that uses a burner flame that consists of many smaller flames arranged over a larger area rather than one single large flame, thus reducing adiabatic flame temperature which reduces pollutants and also allows for better radiation heat transfer from the burner to the plates of the heat exchanger.

Other objects, features and advantages of the present invention will become apparent from the subsequent description and the appended claims, taken in conjunction with the accompanying drawings.

BRIEF DESCRIPTION OF THE PREFERRED EMBODIMENT(S)

Referring to the drawings, there is shown a fluid heating apparatus 10 according to an embodiment of the present invention. The fluid heating apparatus 10 is a high efficiency low pollutant apparatus that will create and fill the demand for more efficient and cleaner heating systems. The fluid heating apparatus 10 may be used in any type of heating system, such as a water heater, boiler, cooking appliances, chemical processing systems, cooking applications etc, and for any other system that needs to heat fluids for use by an external source. As shown in the figures, the fluid heating apparatus 10 generally comprises a heat exchanger, a high efficiency gas burner, a blower for providing combustion air, a gas train or pipe and an emission system. Generally, the heat exchanger, which is at the heart of the present invention, will utilize heat from the gas burner via convection and radiation to heat a fluid 12 circulating within the heat exchanger. This fluid 12 may be any known fluid or may even be a gas, but generally speaking in the contemplated embodiment the fluid may be water, oil, chemical or any other fluid type substance that is capable of being heated to predetermined temperatures. The fluid heating apparatus 10 may be used as a water heater, a boiler, for any known chemical processing system, for cooking applications and the like. Therefore, the fluid heating apparatus 10 according to the present invention is not restricted to just traditional heat exchangers but may be used in any application that needs a heated fluid or heated gas that may be transformed into a fluid.

As shown in the figures, the fluid heating apparatus 10 comprises a body or jacket 14 which in one contemplated embodiment may be in the form of a cylinder jacket. It should be noted that the body 14 generally may be made of a steel material, however any other ceramic, composite, plastic, natural material, metal or the like that is capable of operating within a high temperature environment may be used for the body 14 of the fluid heating apparatus 10 according to the present invention. Also, it should be noted that in the contemplated embodiment and in the figures shown a cylindrical type jacket shape is used, however any other type body may be used depending on the design requirements and environment in which the fluid heating apparatus 10 may be used. The body 14 generally may have on one end thereof an orifice 16, generally arranged at a center of the side wall. Within this end will be arranged a burner 18. On the opposite end of the body 14 may be arranged a second orifice 20 that may or may not include a collar 22 extending from a second side surface thereof through which the flue gasses 24 will exit the body 14 of the fluid heating apparatus 10. The inner chamber of the body 14 of the fluid heating apparatus 10 generally may be separated into two separate chambers by a ring like shaped wall 26 that extends from an internal surface through a predetermined distance from the exhaust side end of the body 14. It should be noted that an exhaust vent pipe may be arranged in the orifice on the exhaust end of the body 14 or may be formed integrally with the end of the body 14. In one contemplated embodiment the ends of the body 14 of the fluid heating apparatus 10 may be two round discs that are inserted and welded into each end or may be formed as one integral piece. It is also contemplated to have mounting brackets arranged on the outside surface of the body 14 of the fluid heating apparatus 10 to allow for easy installation of the fluid heating apparatus 10 into any known environment that may be used therein.

Attached to the outer surface of the body 14 of the fluid heating apparatus 10 may also be an inlet manifold 28 and an outlet manifold 30 for the fluid 12 that is circulating within the heat exchanger. However, it is also contemplated to have the inlet manifold 28 and outlet manifold 30 arranged within the body 14 of the fluid heating apparatus 10 with the appropriate insulating materials arranged there around to not affect any heat loss occurring within the fluid 12 to the outer environment of the fluid heating apparatus 10.

Arranged within the body 14 of the fluid heating apparatus 10 is the heat exchanger, which generally comprises a series of parallel very thin, round, hollow doughnut shaped plates with an inlet 34 and outlet tube 36 attached to an outer circumference thereof. Generally, these plates are aligned parallel and secured to one another with a predetermined gap in between each plate. The gap is generally a minimal gap of any dimension necessary to optimize flue gas velocity and maximize convection heat transfer from the hot gases to the plate. The inlet tubes 34 are joined together with the common inlet manifold 28 while the outlet tubes 36 are joined together with the common outlet manifold 30. Generally, these hollow doughnut shaped plates 32 are made from two half shell round embossed plates welded or brazed together at the seams on the internal and external circumferences thereof. However, any other chemical or mechanical processes may be used to join the hollow doughnut shaped or concentric plates that are arranged to form both a primary heat exchanger 38 and secondary heat exchanger 40 of the present invention. It should be noted that in one contemplated embodiment steel is used to form the hollow doughnut shaped plates 32, however any other known material, such as but not limited to any known metal, ceramic, composite, plastic or natural material that is capable of withstanding and operating within the high heat of the fluid heating apparatus 10 of the present invention may also be used. The invention utilizes the plurality of doughnut shape parallel plates to allow for a much larger total cross sectional area of the flow passage, hence creating a minimum pressure drop across the heat exchanger 38, 40. The hollow doughnut shaped plates 32 divide the fluid body into small sections and increases the contact surface area and, therefore the heat transfer efficiency. In one contemplated embodiment the hollow doughnut shaped plates 32 generally are connected via at least one bar or pole connecting member via a well or any other known connecting methodology, such that a predetermined gap occurs between adjacent plates within both the primary heat exchanger 38 and the secondary heat exchanger 40. These connecting bars may be arranged on the outer circumference of the hollow doughnut shaped plates 32 or on the inner circumference of the hollow doughnut shaped plates 32 depending on the design requirements. It is also contemplated to form the hollow doughnut shaped plates 32 as a single structure with the inlet and outlet tubes 34, 36 cast and preformed therein without having to create two separate pieces and weld them together as currently contemplated. Any known casting or forming technique may be used to create the hollow doughnut shaped plates 32 and associated inlet and outlet tubes 34, 36 that extend from the outer circumference of each plate. It should be noted that it is also contemplated to have the inlet and outlet tubes 34, 36 extend from the inner circumference of the hollow doughnut shaped plate 32 or from a side surface of the hollow doughnut shaped plate 32 depending on the design environment in which the heat exchanger and fluid heating apparatus 10 will be used.

Arranged within the body 14 of the fluid heating apparatus 10 is a blocking plate 42, which generally has the same hollow plate description as described above for the hollow doughnut shape or concentric plates with the exception that there is no orifice or hole at its center, thus making it a hollow disc rather than a hollow doughnut type shape, such that the outer sides are completely solid. This blocking plate 42 is inserted at a predetermined position within the middle of the parallel series of hollow doughnut shaped plates 32. The exact position of the blocking plate 42 is determined by the size and capacity of the heat exchanger and the application in which the fluid heating apparatus 10 will be used. Generally, the blocking plate 42 defines or creates a line of demarcation between the primary heat exchanger 38 and the secondary heat exchanger 40 which are arranged within the body 14 of the fluid heating apparatus 10. The plates are arranged generally concentric and parallel to one another with the predetermined gap, as discussed above, maintained therebetween. After the series of plates, which form both the primary heat exchanger 38 and secondary heat exchanger 40 along with the blocking plate 42, are fixed to one another with a predetermined gap therebetween, they are then inserted within the body 14 of the fluid heating apparatus 10 with the inlet 28 and outlet manifolds 30 generally connected to each side of the series of plates. The two ends of the jacket 14 are then closed, in one embodiment by the two round discs described above, one for the exhaust end and the other for the burner end of the fluid heating apparatus 10. Both of the ends will have an orifice 16, 20 generally arranged at the center point thereof, however the orifice may be offset depending on the design requirements. The burner end of the body 14 may have an orifice 16 for the burner 18 insertion therein, while the opposite end of the body 14 may have a hole or orifice 20 for an exhaust vent pipe or other venting mechanism to be arranged therein or affixed to the outer surface of the body 14 of the fluid heating apparatus 10. Generally, the plates on the burner side of the blocking plate 42 form the primary heat exchanger 38 while the plates on the exhaust side of the blocking plate 42 form the secondary heat exchanger 40 as defined above.

The fluid heating apparatus 10 also may comprise a high efficiency gas burner being inserted inside the center of the primary heat exchanger 38 formed by the center of the hollow doughnut shaped plates 32 which are aligned and fixed to one another with a predetermined gap in a parallel concentric arrangement. It should be noted that the burner 18 may operate with any type of fuel. The burner 18 also may include a blower 44 that mixes a gas and outside air, along with an ignition system 46 that is arranged within a space between the inner circumference of the heat exchanger doughnut shaped plates 32 and the outer circumference of the high efficiency burner 18. This ignition system 46 generally ignites the burner 18 via a predetermined electronic or chemical signal via a computer, button switch or manual operation by a user of the fluid heating apparatus 10. The outer surface of the burner 18 is arranged a predetermined distance from the inner surface of the hollow plates of the primary heat exchanger 38. This distance or gap is also determined so that the small flames do not impinge on the inner circumference of the plates which may improve the emission of pollutants, while increasing the life of the heat exchanger. Thus, the flame 48 of the burner 18 may heat the surface of the burner 18 which then emits a radiant energy from the burner 18 to the hollow plates which carries the fluid 12 therein. The flue gasses 24 from the combustion of the fuel of the burner 18 will travel in-between the plates in a radial direction through the gaps in-between adjacent plates thus heating the plates by convection heat transfer. These flue gasses 24, which pass through each gap, collect under the jacket 14 and then travel along the outer circumference length of the jacket 14 to the secondary heat exchanger 40. Then the flue gasses 24 will travel in a radial downward or inward direction through the gaps in-between the secondary heat exchanger plates and collect at the center of the secondary heat exchanger 40 and then exit through a vent pipe 22 in the opposite end of the body 14 of the fluid heating apparatus 10. Generally, at this point, the flue gasses 24 may be condensed and maximum heat is extracted from them before they are exhausted. This condensation generally may be in the form of water which is then collected at the bottom of the small section of the body 14 and will be exited from the body 14 of the fluid heating apparatus 10 by means of a small tube 50 or any other known exiting technology to have water exit therefrom. A small tube may be used, however it may also be a hole or other methodology for removing water from a predetermined portion of the body 14 of the fluid heating apparatus 10.

Generally, the fluid heating apparatus 10 may have a fluid 12 pass through the heat exchanger such that a cold fluid will normally enter a first section 52 of the inlet manifold 28. The inlet manifold 28 has a predetermined length that will generally be longer than the heat exchangers total length. The inlet manifold 28 may have a blocking wall 54 arranged at a predetermined distance from one end thereof. This blocking wall 54 will not allow for fluid 12 to pass between the first section 52 of the inlet manifold 28 and a second section 56 of the inlet manifold 28. It should be noted that inlet manifold 28 may also comprise two separate inlet and outlet sections arranged adjacent to one another. The outlet manifold 30 generally will extend beyond each end of the heat exchanger a predetermined amount or the entire length of the heat exchanger and allow for fluid flow therethrough. As described above, cold fluid normally will enter the first section 52 of the inlet manifold 28. This will allow for the coldest fluid 12 to contact the hottest section of the heat exchanger at the primary heat exchanger 28 for maximum heat transfer. Next the fluid 12 may pass through the plates 32 of the primary heat exchanger 38 to the outlet manifold 30. Here the fluid 12 may then travel along the outlet manifold 30 into another position of the primary heat exchanger 38 and the secondary heat exchanger 40 at the same time. The fluid 12 will exit the outlet manifold 30 into both of these heat exchangers plates, such that the fluid 12 will then pass through the inside of the hollow plates of both the primary heat exchanger 38 and the secondary heat exchanger 40 into the second section 56 of the inlet manifold 28. The hot fluid will then move through the second section 56 of the inlet manifold 28 and exit from there out of the heat exchanger to the requesting equipment or source. The inlet manifold 28 may have an outlet 62 and inlet orifice 60 arranged therein which allows for the cold fluid to enter into the first section 52 of the inlet manifold 28 and the heated fluid to exit from the second section 56 of the inlet manifold 28 to the source that needs the heated fluid. In the embodiment shown, the cold fluid that enters the first section 52 of the inlet manifold 28 will pass through a predetermined number of plates, depending on the flow capacity of the heat exchanger 38 and then return through the remaining plates of the primary heat exchanger 38 and the plates of the secondary heat exchanger 40 to the second section 56 of the inlet manifold 28 where the heated fluid will exit the fluid heating apparatus 10 to the source requiring the heated fluid. It should be noted that in the embodiment shown a total of eighteen plates are used to form the primary heat exchanger 38 and the secondary heat exchanger 40 i.e., one blocking plate 42 is arranged between seventeen hollow doughnut shaped plates 32 to form the entire heat exchanger unit. However, any other number of blocking plates 42 and doughnut shaped plates may be used depending on the fluid heating apparatus 10 design requirements and environment in which it will be used. It should further be noted it is also contemplated to use more than one blocking plate 42 within the heat exchanger depending on the design requirements and temperature of the fluid 12 needed.

Figure 5:
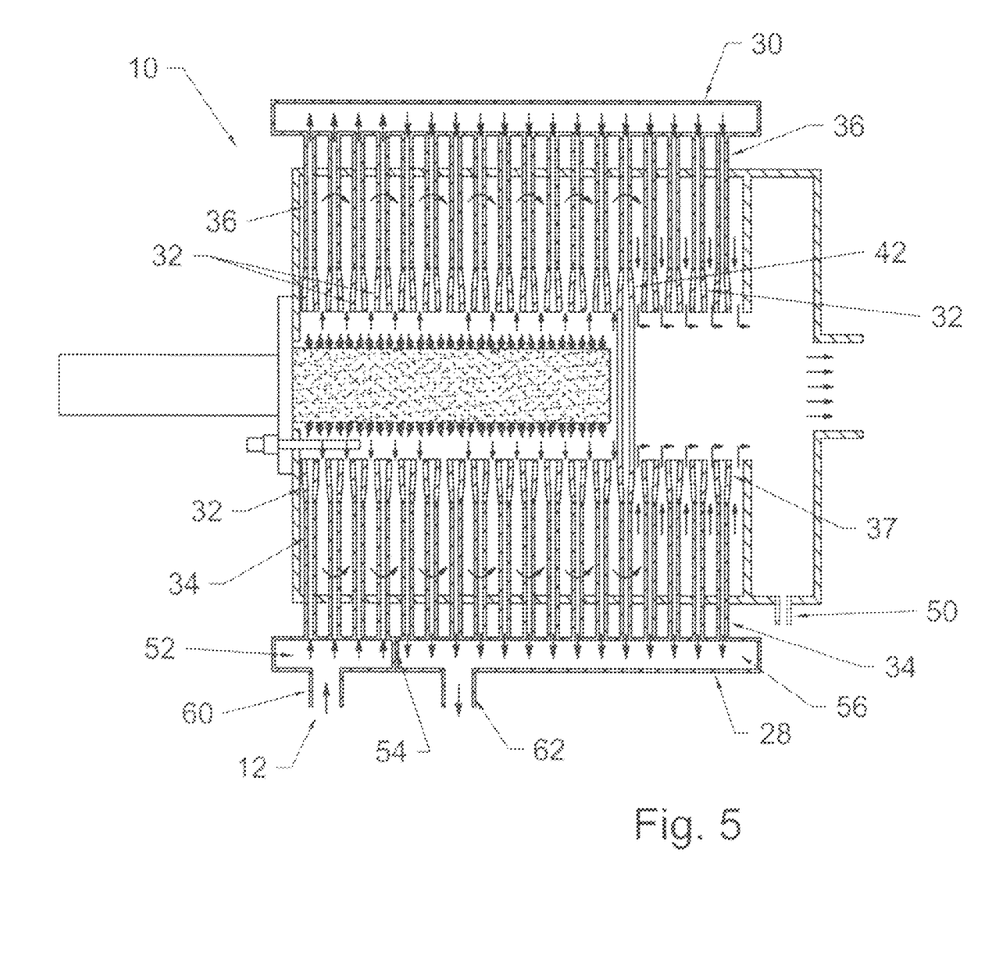
FIG. 5 shows a cross sectional view of a fluid heating apparatus according to the present invention.

It should be noted that the doughnut shaped plates 32 are easy and inexpensive to manufacture via a stamping process. The inlet and outlet tubes 34, 36 are part of the plate 32 and not a separate part which needs to be attached by a secondary process. However, it should be noted that it is also contemplated to have the inlet and outlet tubes 34, 36 that are attached via secondary process depending on the design requirements and manufacturing costs and assembly costs related thereto. It should further be noted that the burner flame 48 generally consists of thousands of smaller flames arranged over a larger area rather than one single large flame which is used often in prior art fluid heating apparatuses. This will allow for reduction of the adiabatic flame temperature which may result in reduction of oxides of nitrogen which generally are classified as a pollutant. Furthermore, the use of the high efficiency burner 18 may allow for a better radiation heat transfer from the burner 18 to the plates 32 of the primary heat exchanger 38. As shown in FIG. 5, generally the inlet and outlet manifold 28, 30 are arranged on opposite sides of the body 14 of the fluid heating apparatus 10, however they may be arranged side by side depending on the design requirements of the fluid heating apparatus 10, such that having the inlet and outlet manifolds 38, 40 on opposite ends of the plates 32, 42 may not be practical in the design and environment in which the fluid heating apparatus 10 may be used. It should be noted that the associated related electronics for operation of the gas burner 18 and ignition system 46 may also be connected to the body 14 of the fluid heating apparatus 10 or may be remote depending on the design requirements of the fluid heating apparatus 10. It should be noted that the manifolds 28, 30 are made of a steel material, however any other known metal, ceramic, composite, natural material or plastic that is capable of withstanding high heat and temperatures may be used for the inlet and outlet manifolds 28, 30 as described herein. It should also be noted that insulation may be arranged around the outer surface of the fluid heating apparatus 10, body 14 or on internal surfaces of the fluid heating apparatus 10 or body 14 depending on the design requirements and environment in which the fluid heating apparatus 10 may be used.

Figure 1:
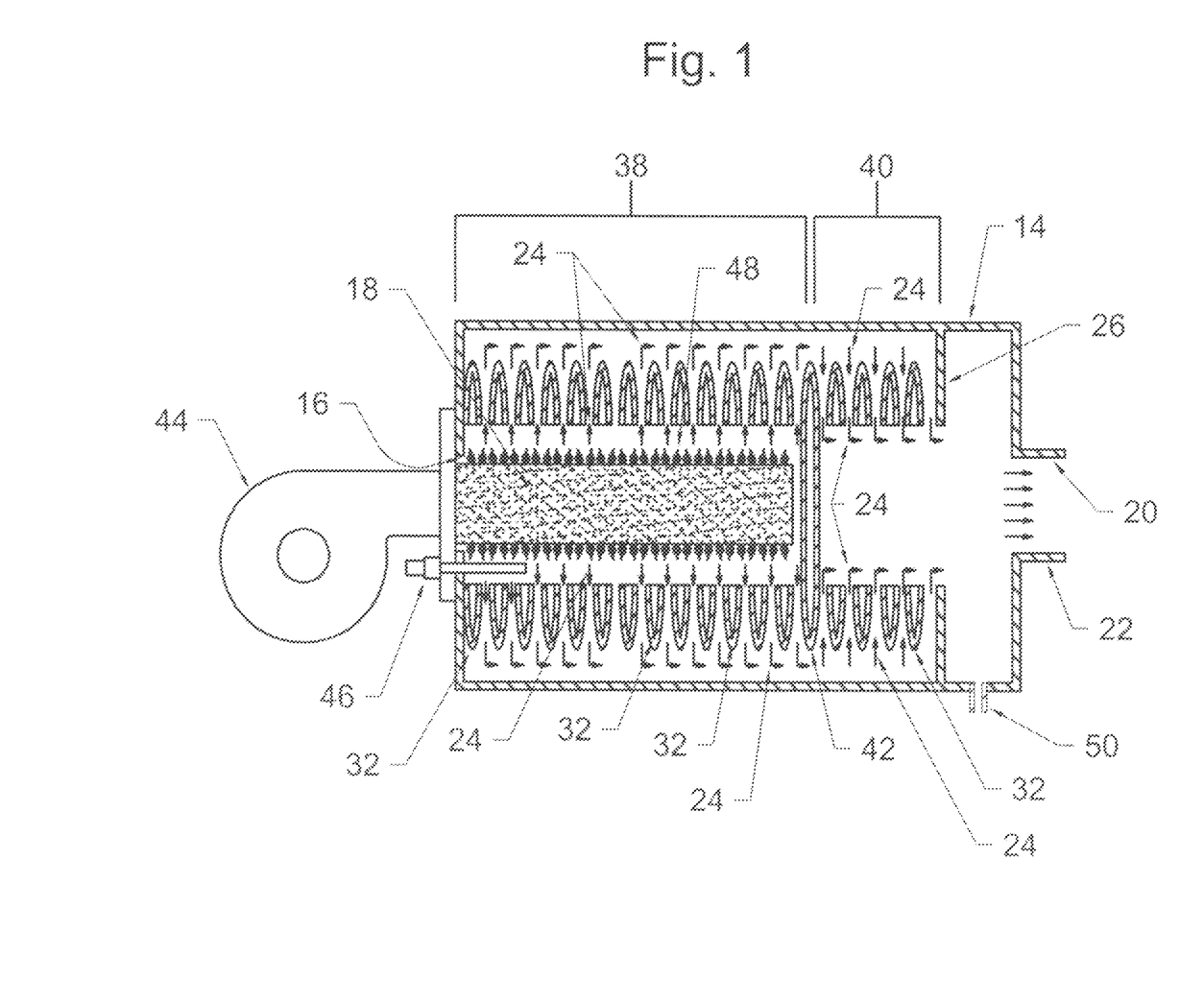
FIG. 1 shows a partial cross section of a fluid heating apparatus according to the present invention.
Figure 2:
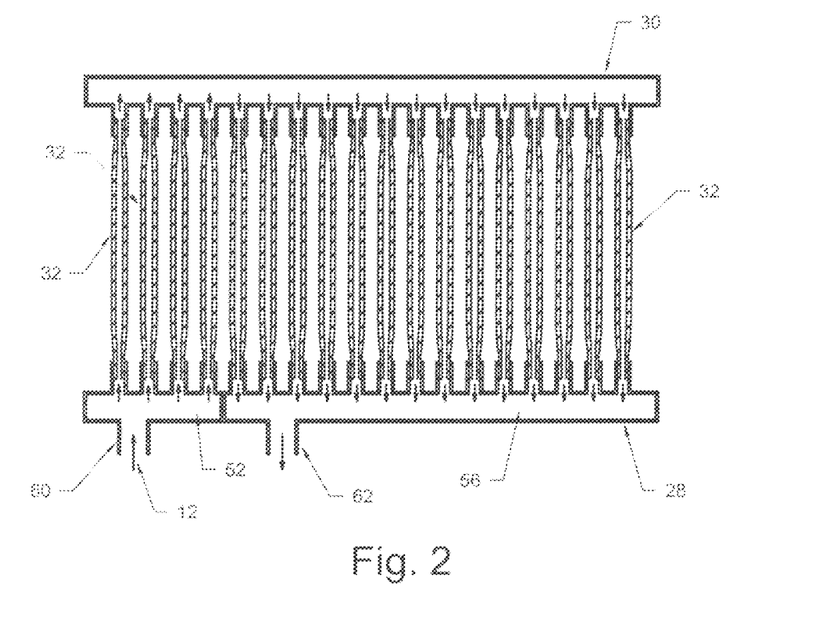
FIG. 2 shows a cross section of the fluid heating apparatus manifold and heat exchangers according to the present invention.
Figure 3:
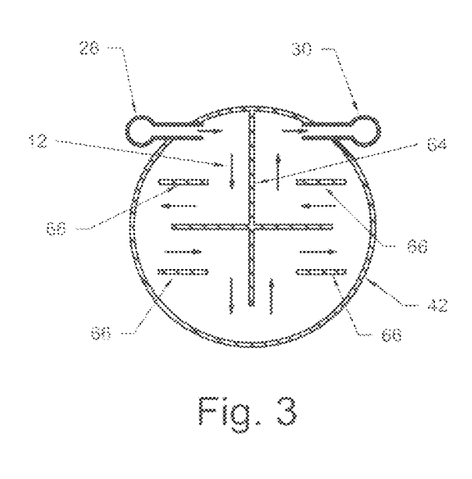
FIG. 3 shows a cross sectional view of a blocking plate according to the present invention.
Figure 4:
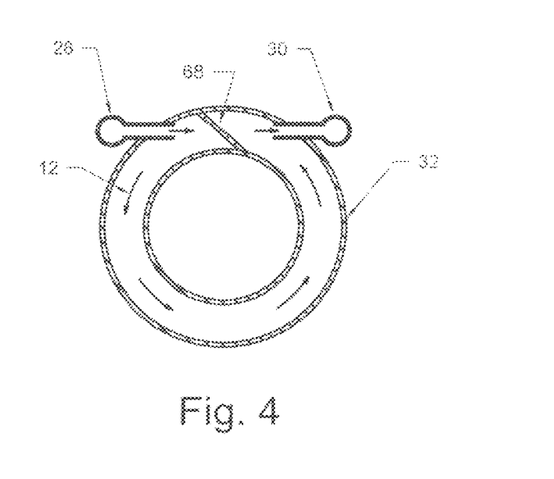
FIG. 4 shows a cross sectional view of a concentric or doughnut shaped plate according to the present invention.

As shown in FIGS. 3 and 4, the plates according to the present invention generally may have at least one baffle or wall arranged therein. In particularly, FIG. 3 shows a cross sectional view of a blocking plate 42 according to the present invention. A wall 64 generally in the shape of a cross is arranged at a center point of the blocking plate 42. One extension of the wall 64 may engage with and secure to a surface of the blocking plate 42 thus creating a separating wall between the inlet manifold tube 34 and the outlet manifold tube 36 for the blocking plate 42. As shown in FIG. 3, at least one, in this embodiment a plurality of baffles 66 are arranged in each quadrant of the blocking plate 42. The baffles 66 may be arranged in any predetermined position to create the necessary fluid flow through the blocking plate 42 as desired by the designer of the fluid heating apparatus 10. In the embodiment shown one baffle 66 is arranged in each quadrant of the blocking plate 42, which is defined by the cross shaped wall that is arranged between inner surfaces of the blocking plate 42. The baffles 66 may be arranged in any general direction or arranged as shown in the Figures wherein they are parallel to one wall of the cross wall and perpendicular to the other wall and arranged predetermined distances from each of those walls and from the outer circumferential surface of the blocking plate 42. It should be noted that the cross like wall and baffles within the blocking plate 42 generally are made of a steel material, however any other metal, ceramic, plastic, composite, or natural material may be used for the baffles. It should be noted that the baffles 66 may be arranged to create any predetermined fluid flow through the blocking plate 42 depending on the design requirements and necessary temperature of the fluid 12 being used thereof. The baffles 66 also may create a necessary passage for the fluid 12 through the plate to maximize heat transfer from the plate to the fluid 12.

As shown in FIG. 4 the hollow doughnut shaped or concentric plate 32 generally will include a blocking wall 68 arranged between an inner circumferential wall and outer circumferential wall of the concentric doughnut shaped plate. The blocking wall 68 may be arranged between the inlet and outlet tubes 34, 36 of each concentric doughnut shaped plate. In one embodiment contemplated, the blocking wall 68 is placed at an angle between the inner circumferential wall and outer circumferential wall to encourage fluid flow through the concentric doughnut shaped plate. However, the blocking wall 68 may be placed perpendicular to the inner or outer circumferential surface or at a tangent or any known angle depending on the design requirements of the hollow doughnut shaped plate 32. It is further contemplated to use a plurality of baffles within the hollow shaped doughnut plate if necessary.

The present invention has been described in an illustrative manner. It is to be understood that the terminology which has been used is intended to be in the nature of words of description rather than that of limitation.

Many modifications and variations of the present invention are possible in light of the above teachings. Therefore, within the scope of the appended claims, the present invention may be practiced otherwise than as specifically described.

What is claimed is:

1. A fluid heating apparatus, said apparatus comprising:
a body;
a primary heat exchanger arranged within said body;
a secondary heat exchanger arranged adjacent to said primary heat exchanger and within said body;
a burner arranged within said primary heat exchanger,
said primary heat exchanger comprising a plurality of concentric plates arranged over said burner;
a thermally conductive hollow blocking plate having complete outer sides without an orifice at a center thereof, said blocking plate arranged adjacent to one of said concentric plates, said blocking plate having a fluid passing through an inside thereof;
said secondary heat exchanger comprising a plurality of concentric plates arranged adjacent to said blocking plate; and
a manifold in fluid communication with said primary heat exchanger plurality of concentric plates, said secondary heat exchanger plurality of concentric plates and said blocking plate.

2. The apparatus of claim 1 further comprising a blower arranged on one end of said body.

3. The apparatus of claim 1 further comprising an ignition system arranged within said body adjacent to said burner.

4. The apparatus of claim 1 wherein said blocking plate forms a barrier between said primary heat exchanger and said secondary heat exchanger.

5. The apparatus of claim 1 further comprising an orifice in an end opposite said blower, said orifice for exhausting gasses from said body.

6. The apparatus of claim 1 wherein said body having a generally cylindrical shape.

7. The apparatus of claim 1 wherein said blocking plate generally having a disc shape, said blocking plate having at least one baffle arranged therein.

8. The apparatus of claim 1 wherein said primary heat exchanger concentric plates and said secondary heat exchanger concentric plates having a generally hollow doughnut shape, said primary heat exchanger concentric plates and said secondary heat exchanger concentric plates having a wall arranged therein.

9. The apparatus of claim 7 wherein said baffles create a fluid path through said blocking plate interior between a first orifice and a second orifice.

10. The apparatus of claim 8 wherein a fluid flows between a first orifice and a second orifice of said primary heat exchanger concentric plate and between a first orifice and a second orifice of said secondary heat exchanger concentric plate, said wall is arranged adjacent to and in between said first and second orifice, said primary heat exchanger plurality of concentric plates and said secondary heat exchanger plurality of concentric plates create a large cross sectional flow passage area to reduce a pressure drop across said primary and secondary heat exchangers.

11. The apparatus of claim 1 wherein said manifold having an inlet and outlet manifold.

12. The apparatus of claim 1 wherein said primary heat exchanger concentric plates, said secondary heat exchanger concentric plates and said blocking plate are arranged parallel to one another with a predetermined gap between each of said primary heat exchanger concentric plates, said secondary heat exchanger concentric plates and said blocking plates.

13. The apparatus of claim 1 wherein each individual concentric plate of said primary heat exchanger plurality of concentric plates and said secondary heat exchanger plurality of concentric plates having an inlet tube extending therefrom and into said manifold and an outlet tube extending therefrom and into said manifold.

14. The apparatus of claim 11 wherein a cold fluid enters a first section of said inlet manifold then travels through said primary heat exchanger into said outlet manifold, said fluid then travels through another portion of said primary heat exchanger and said secondary heat exchanger into a second section of said inlet manifold as a hot fluid.

15. A fluid heating apparatus, said apparatus comprising:
a body;
a primary heat exchanger arranged within said body;
a secondary heat exchanger arranged adjacent to said primary heat exchanger and within said body;
a burner arranged within said primary heat exchanger;
said primary heat exchanger comprising a plurality of concentric plates arranged over said burner, said burner is inside a hollow portion of all of said plurality of concentric plates of said primary heat exchanger,
a thermally conductive blocking plate having a hollow disc shape without an orifice at a center thereof arranged adjacent to one of said concentric plates, said blocking plate having a fluid passing through an inside thereof;
said secondary heat exchanger comprising a plurality of concentric plates arranged adjacent to said blocking plate;
a manifold in fluid communication with said primary heat exchanger and secondary heat exchanger plurality of concentric plates and said blocking plate; and
said burner having a plurality of smaller flames arranged over an outer surface thereof which reduces adiabatic flame temperature and emission of oxides of nitrogen, said plurality of smaller flames heats said outer surface of said burner to increase radiation heat transfer from said outer surface of said burner to said primary heat exchanger plurality of concentric plates, said burner and said primary heat exchanger plurality of concentric plates having a gap therebetween, said gap is sized such that said plurality of smaller flames do not impinge on an inner circumference of said primary heat exchanger plurality of concentric plates.

16. A high efficiency low pollutant fluid heating apparatus, said apparatus comprising:
a body;
a first set of hollow ring shaped plates arranged within said body and adjacent to a first end of said body;
a thermally conductive blocking plate having a hollow disc shape without an orifice at a center thereof arranged adjacent to said first set of plates, said blocking plate having a fluid passing through an inside thereof;

a second set of hollow ring shaped plates arranged adjacent to said blocking plate;

a first manifold in fluid communication with said first set and second set of hollow ring shaped plates and said blocking plate;

a second manifold in fluid communication with said first set and second set of hollow ring shaped plates and said blocking plate;

a burner arranged within said body and within said first set of ring shaped plates;

a blower connected to said body and adjacent to said burner; and said first manifold and said second manifold connected to said first set of said plates, said second set of said plates and said blocking plate.

17. The apparatus of claim 16 wherein said burner is high efficiency and is ignited by an ignition system arranged in said body.

18. The apparatus of claim 16 wherein said first manifold having an inlet port and an outlet port, said first manifold having a first section and a second section.

19. The apparatus of claim 16 wherein said first set and second set of hollow ring shaped plates and said blocking plate are arranged concentric and parallel to each other with a predetermined size gap between each of said first set and second set of hollow ring shaped plates and said blocking plate.

* * * * *